United States Patent
Lai

(10) Patent No.: US 6,763,844 B2
(45) Date of Patent: Jul. 20, 2004

(54) FUEL TANK STRUCTURE OF A REMOTELY CONTROLLABLE CAR

(76) Inventor: Aling Lai, P.O.Box 2103, Taichung (TW)

( * ) Notice: Subject to any disclaimer, the term of this patent is extended or adjusted under 35 U.S.C. 154(b) by 198 days.

(21) Appl. No.: 10/208,709

(22) Filed: Jul. 30, 2002

(65) Prior Publication Data

US 2004/0020530 A1 Feb. 5, 2004

(51) Int. Cl.$^7$ .............................................. F16K 11/18
(52) U.S. Cl. ........................ 137/44; 137/590; 137/601.2
(58) Field of Search ........................... 137/38, 44, 590, 137/601.2

(56) References Cited

U.S. PATENT DOCUMENTS

| | | | | |
|---|---|---|---|---|
| 2,332,007 A | * | 10/1943 | Parker | 137/38 |
| 2,831,490 A | * | 4/1958 | Harold | 137/38 |
| 2,933,095 A | * | 4/1960 | Douglas | 137/38 |
| 4,813,445 A | * | 3/1989 | Lu | 137/38 |
| 4,958,655 A | * | 9/1990 | Danek | 137/80 |
| 5,346,104 A | * | 9/1994 | Jeong | 222/402.19 |

* cited by examiner

Primary Examiner—Stephen Hepperle

(57) ABSTRACT

A fuel tank structure of a remotely controllable car. A fuel pipe is disposed in the fuel tank. A middle section of the fuel pipe has a fuel outlet by which the interior of the fuel pipe is divided into a first section and a second section. Two steel balls are respectively disposed in the first and second sections. The ends of the first and second sections proximal to the fuel outlet are respectively formed with a first and a second passages. The ends of the first and second sections distal from the fuel outlet are respectively formed with a first and a second receiving sections. The fuel pipe is formed with a first inlet between the first passage and the first receiving section and a second inlet between the second passage and the second receiving section. In normal state, the steel ball in the first section due to its own weight will block the first passage, while the steel ball in the second section will drop into the second receiving section, permitting the fuel to pass through the second inlet and discharge from the fuel outlet.

6 Claims, 10 Drawing Sheets

FUEL TANK STRUCTURE OF A REMOTELY CONTROLLABLE CAR

BACKGROUND OF THE INVENTION

A present invention is related to a fuel tank structure of a remotely controllable car. By means of the fuel tank, in case that the remotely controllable car turns over and the fuel tank is reversed, the fuel can still successfully go into the fuel pipe and discharge for the engine to use.

FIG. 6a shows a conventional fuel tank of a remotely controllable car. The fuel tank has a gas inlet 71 and a fuel outlet 72. A fuel pipe 73 is disposed in the fuel tank. One end of the fuel pipe 73 is connected with the fuel outlet 72, while the other end thereof is provided with a fuel filter 74.

When starting the remotely controllable car, the exhaust gas exhausted from the engine is conducted through the gas inlet 71 into the fuel tank to force the fuel F to go through the fuel filter 74, the fuel pipe 73 and the fuel outlet and leave the fuel tank for the engine to use.

In running, the remotely controllable car is quite easy to turn upside down due to jump and collision. Referring to FIG. 6b, when the car turns upside down, the fuel tank is also reversed. Under such circumstance, the fuel F will flow downward. However, the fuel filter 74 is positioned at the top of the fuel tank and is higher than the fuel level. Accordingly, the fuel filter 74 will be unable to conduct and transfer the fuel to the engine. As a result, the engine will be turned off. Especially, the remotely controllable car cannot be directly started as a general car. In case the remotely controllable car turns upside down and breaks down in a raceway, a user needs to carry the remotely controllable car back to the service section for restarting the remotely controllable car and then again put the remotely controllable car into the raceway. This is time-consuming and makes it impossible for the owner to win the race.

FIG. 7a shows another fuel tank often used in a remotely controllable aircraft. A silicone pipe 81 is disposed in the fuel tank. One end of the silicone pipe is connected with the fuel outlet 82, while the other end thereof is provided with a connector 83 for conducting the fuel. The connector 83 has a weight block 84.

Referring to FIG. 7b, in case the fuel tank is reversed, the weight block 84 will drop down due to gravity. Therefore, the connector 83 can still remain at the bottom of the fuel tank to conduct and transfer the fuel. This solves the above problem.

Such fuel tank structure can be applied to the remotely controllable car. However, when the remotely controllable car jumps and turns over, the weight block 84 will move along with the car. The weight block 84 has a considerable weight and tends to pull the silicone pipe 81. Accordingly, the weight block is easy to separate from the silicone pipe. After a long period of soaking in the fuel, the silicone pipe tends to deteriorate. Under such circumstance, the silicone pipe is easy to be torn apart or pulled away from the fuel outlet. This will lead to damage of the fuel tank and make the fuel unable to enter the fuel pipe and the engine.

SUMMARY OF THE INVENTION

It is therefore a primary object of the present invention to provide a fuel tank structure of a remotely controllable car. A fuel pipe is disposed in the fuel tank. A middle section of the fuel pipe has a fuel outlet by which the interior of the fuel pipe is divided into a first section and a second section. Two steel balls are respectively disposed in the first and second sections. The ends of the first and second sections proximal to the fuel outlet are respectively formed with a first and a second passages. The ends of the first and second sections distal from the fuel outlet are respectively formed with a first and a second receiving sections. The fuel pipe is formed with a first inlet between the first passage and the first receiving section and a second inlet between the second passage and the second receiving section. In normal state, the steel ball in the first section due to its own weight will block the first passage, while the steel ball in the second section will drop into the second receiving section. Reversely, in case the fuel tank is reversed, the steel ball in the second section will block the second passage, while the steel ball in the first section will drop into the first receiving section, permitting the fuel to pass through the second inlet and discharge from the fuel outlet. Therefore, in case the remotely controllable car turns over, the engine will not be turned off.

It is a further object of the present invention to provide the above fuel tank structure of the remotely controllable car, in which by means of shifting the steel balls within the fuel pipe, the first or second passage is freed or blocked, permitting the fuel to go through the first or second inlet into the fuel pipe. Therefore, the problem of detachment of the silicone pipe in the prior art is eliminated.

The present invention can be best understood through the following description and accompanying drawings wherein:

DETAILED DESCRIPTION OF THE PREFERRED EMBODIMENTS

Figure 1:
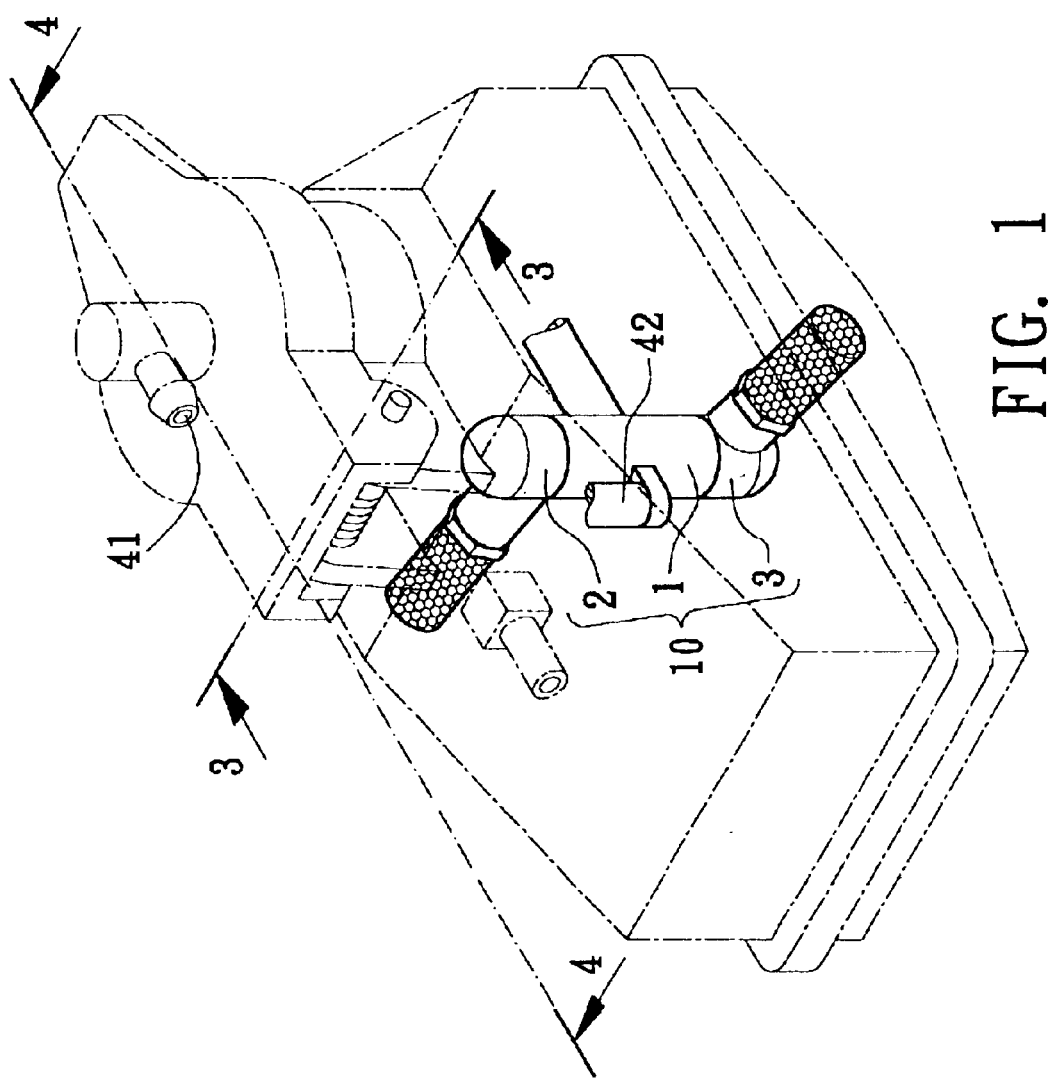
FIG. 1 is a perspective assembled view of the present invention.
Figure 2:
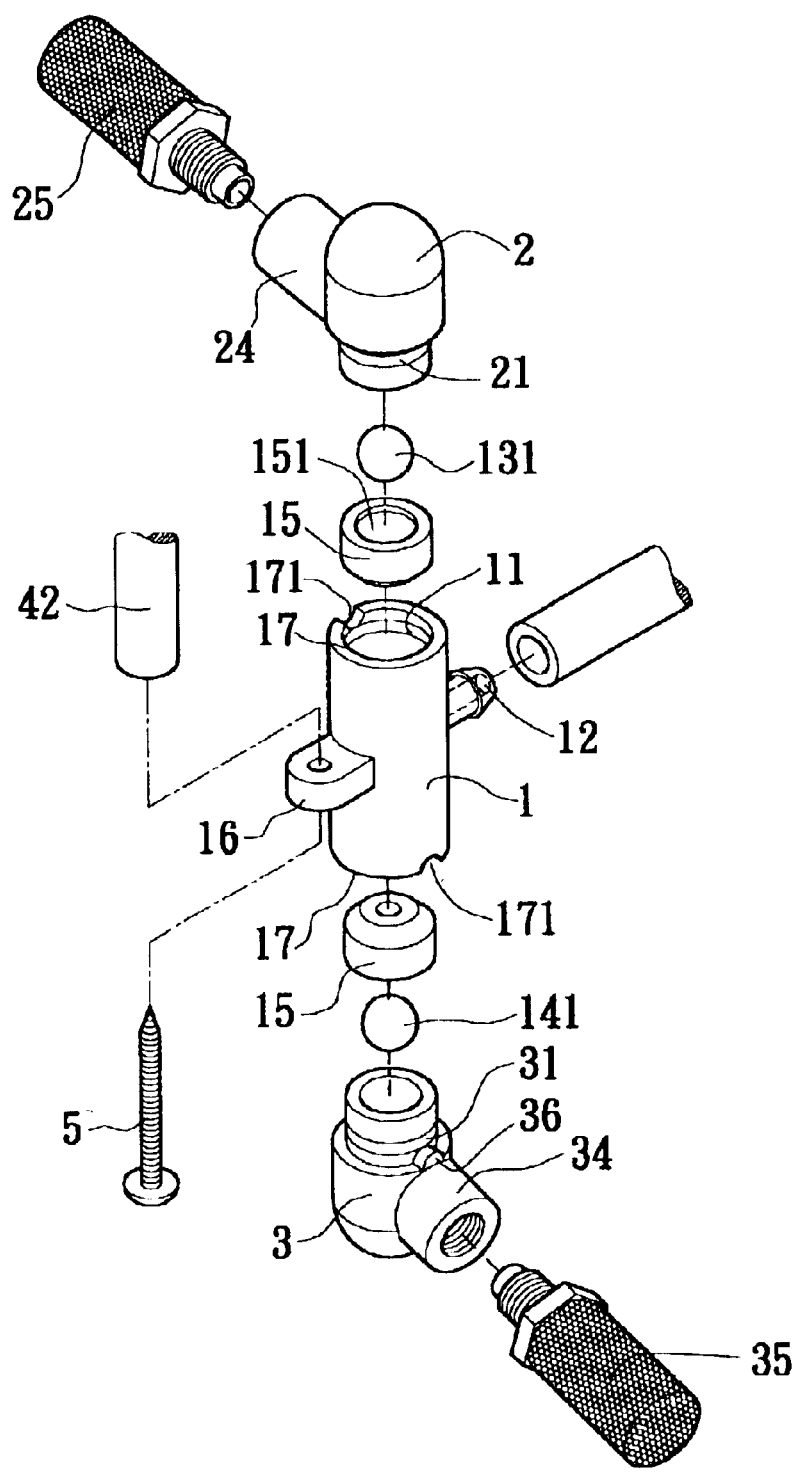
FIG. 2 is a perspective exploded view of the present invention.

Please refer to FIGS. 1 to 4. The fuel tank of the present invention has a gas inlet 41 and a fuel pipe 10 is disposed in the fuel tank. The fuel pipe 10 is upright arranged and composed of an axially through tube 1, a first sealing tube 2 and a second sealing tube 3. The middle section of the through tube 1 has a fuel outlet 12. The through tube has two end edges 17 respectively having two notches 171 radially opposite to each other. The inner circumference of each end of the through tube is formed with an annular groove 11. The first and second sealing tubes 2, 3 respectively have two projecting blocks 26, 36 corresponding to the notches 171 and annular ribs 21, 31 adapted to the annular grooves 11. The projecting blocks 26, 36 of the first and second sealing tubes 2, 3 are respectively aimed at the notches 17 and the annular ribs 21, 31 are respectively inlaid in the annular grooves 11 so as to locate the first and second sealing tubes in a fixed direction and fix the first and second sealing tubes at two ends of the through tube 1 to seal the same. In accordance with the position of the fuel outlet 12, the interior of the fuel pipe 10 is divided into an upper first section 13 and a lower second section 14 opposite to the first section 13. Two steel balls 131, 141 are respectively disposed in the first and second sections 13, 14.

Two washers 15 are respectively disposed at the adjoining sections of the first and second sealing tubes 2, 3 and the through tube 1. Each washer 15 is formed with a first and a second passages 151, 152 which are tapered toward the through tube 1. The ends of the first and second sealing tubes 2, 3 distal from the through tube 1 are respectively formed with a first and a second receiving sections 22, 32.

The fuel pipe 10 is formed with a first inlet 23 between the first passage 151 and the first receiving section 22 and a second inlet 33 between the second passage 152 and the second receiving section 32. Two oblique tubes 24, 34 respectively extend from the first and second inlets 23, 33 and are inclined toward the top face and bottom face of the fuel tank. The two oblique tubes 24, 34 are respectively connected with two fuel filters 25, 35 respectively inclined toward the top face and bottom face of the fuel tank.

In addition, a column 42 is disposed in the fuel tank. The fuel pipe 10 is formed with a connecting section 16 corresponding to the column 42. A bolt 5 is screwed through the connecting section 16 into the column 42 to fix the fuel pipe 10 in the fuel tank.

Figure 3:
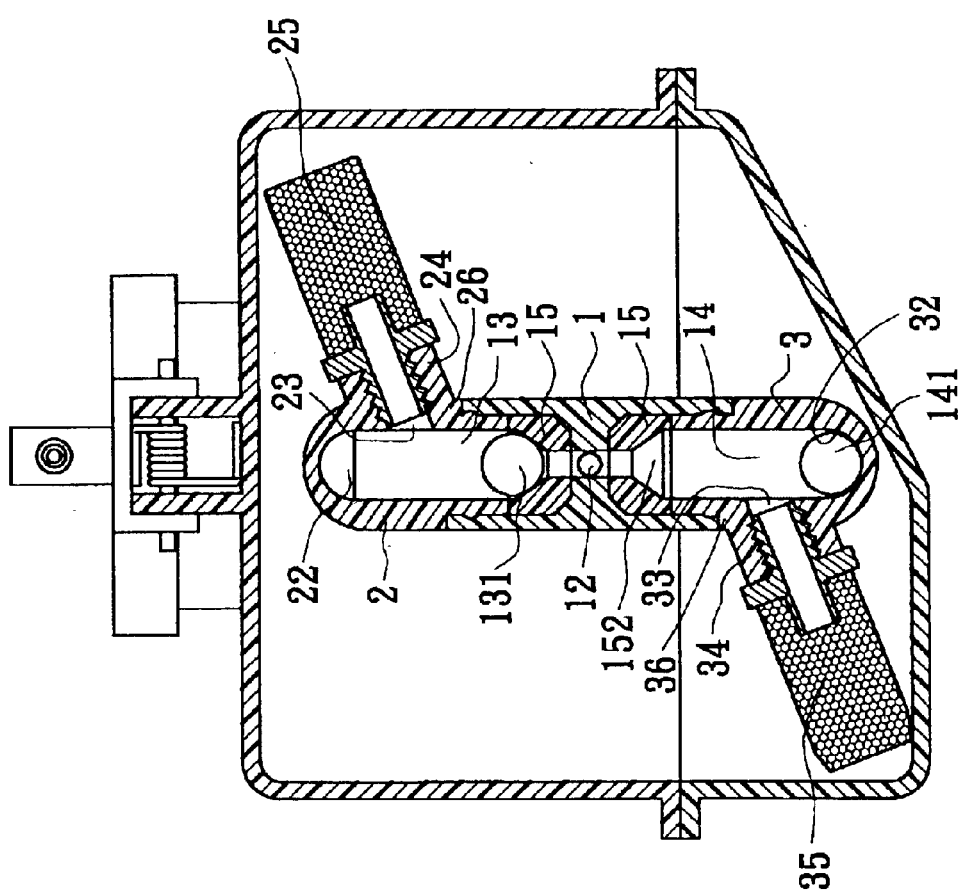
FIG. 3 is a sectional view taken along line 3—3 of FIG. 1.
Figure 4A:
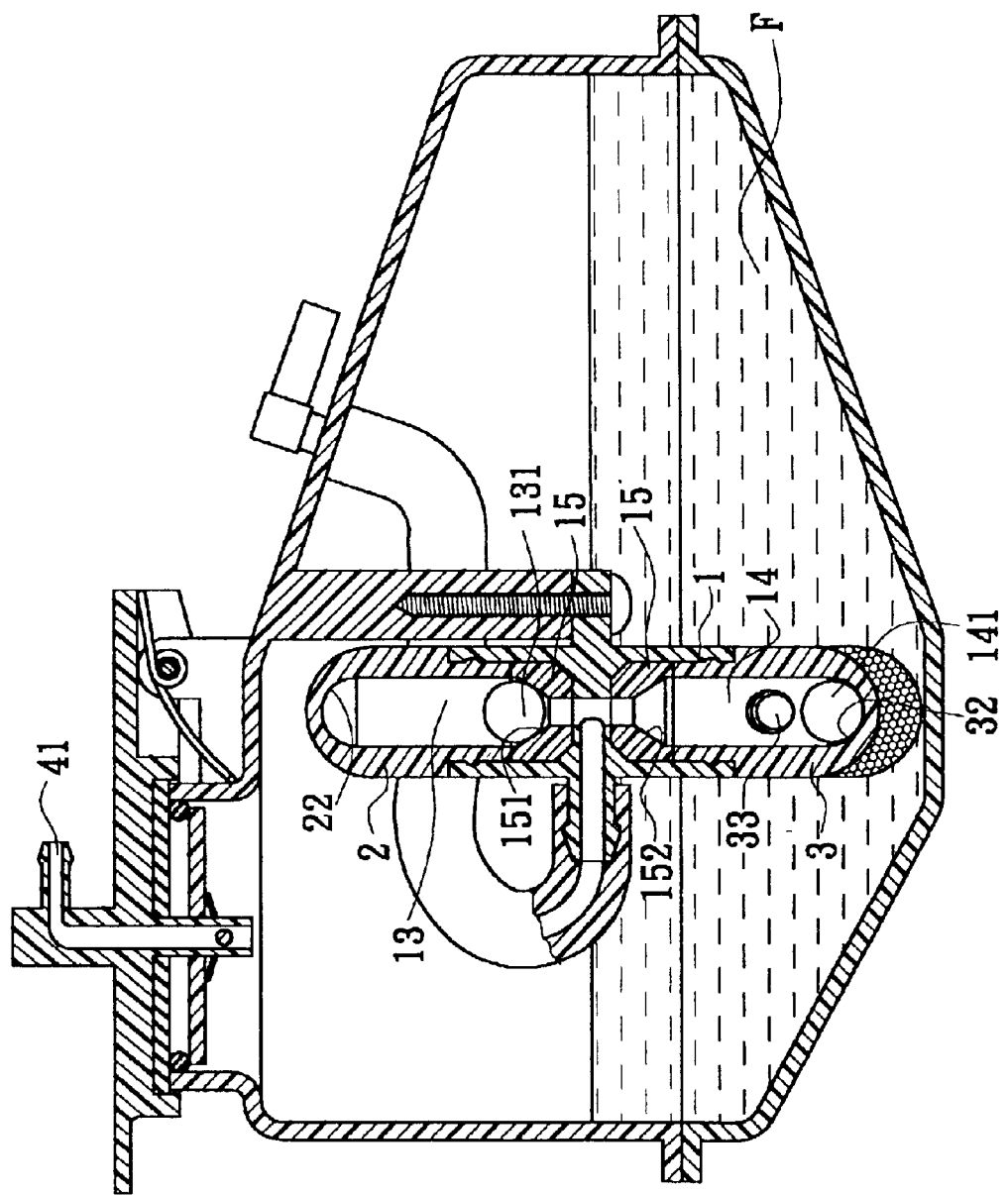
FIG. 4a is a sectional view taken along line 4—4 of FIG. 1.

Referring to FIGS. 3 and 4a, in normal state, when the remotely controllable car and the fuel tank are upright positioned, the steel ball 131 in the first section 13 due to its own weight will sink in the first passage 151 to block the same. The steel ball 141 in the second section 14 due to its own weight will drop into the second receiving section 32 at the bottom end of the second sealing tube 3. The second inlet 33 is positioned between the second passage 152 and the second receiving section 32 so that the second inlet 33 still communicates with the second passage 152 and is in a free state. Accordingly, when the exhaust gas exhausted from the engine is conducted through the gas inlet 41 into the fuel tank, the fuel F will be forced to pass through the fuel filter 35 and get into the second inlet 33. Then the fuel goes through the second passage 152 and the fuel outlet 12 and discharges for the engine to use.

Figure 4B:
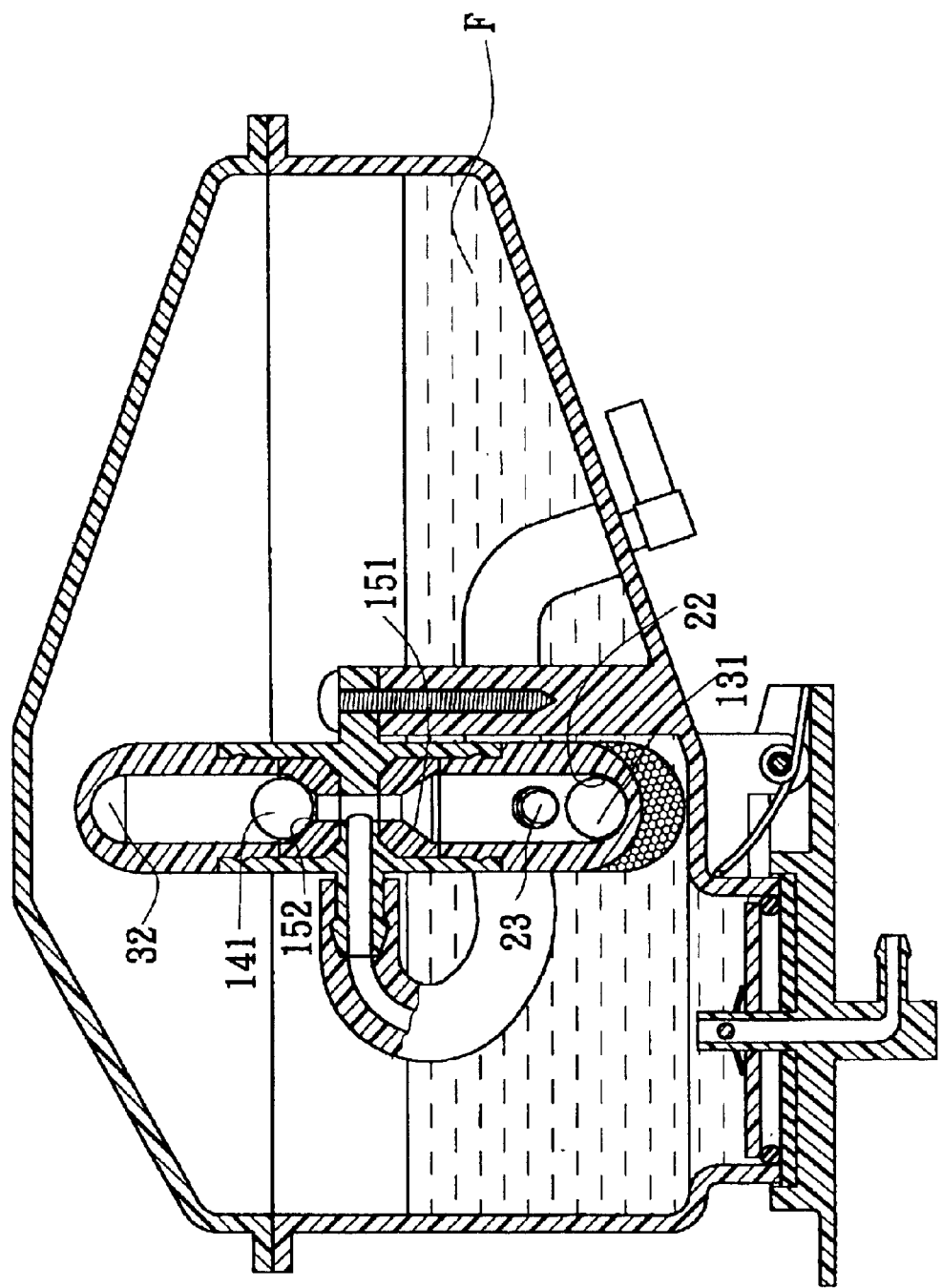
FIG. 4b shows that the remotely controllable car turns over and the fuel tank is reversed, still permitting the fuel to get into the fuel pipe.

Referring to FIG. 4b, in case that the remotely controllable car turns over and the fuel tank is reversed, the fuel F will flow to the bottom of the fuel tank. At this time, the second section 14 is positioned above the first section 13 so that the steel ball 141 in the second section 14 will sink into the second passage 152 to block the same. The steel ball 131 in the first section 13 will drop into the first receiving section 22. Under such circumstance, the fuel F can be still conducted through the fuel filter 25 and the first inlet 23 to go through the first passage 151 and the fuel outlet 12 and discharge. Therefore, in case of turning over, the engine will not be turned off.

It should be noted that when one of the first and second passages 151, 152 is free, the other must be blocked by the steel ball. For example, in the case that the fuel gets into the fuel pipe 10 and goes through the second passage 152 to discharge, the first passage 151 must be blocked. Therefore, the air in the fuel tank will not also enter the fuel pipe 10 and leave the fuel tank.

The fuel filters 25, 35 are respectively inclined and extended to the top face and bottom face of the fuel tank so that the ends of the fuel filters 25, 35 are respectively adjacent to the inner sides of the top and bottom faces of the fuel tank. Therefore, no matter whether the fuel tank is positioned upright or reversed, the fuel filters 25, 35 can reach the fuel on the bottom of the fuel tank. Therefore, even if the amount of the fuel is reduced, the fuel filters 25, 35 can still conduct and transfer the fuel.

In addition, the washers 15 are respectively disposed at the adjoining sections of the sealing tubes and the through tube 1 so as to prevent the fuel from leaking out through the gap between the sealing tubes and the through tube 1. Moreover, the washers 15 serve to reduce the shock of the sealing tubes 1 and the through tube 1 during running of the remotely controllable car. Also, the washers 15 can avoid the infiltration of air caused by jump of the steel balls.

Figure 5:
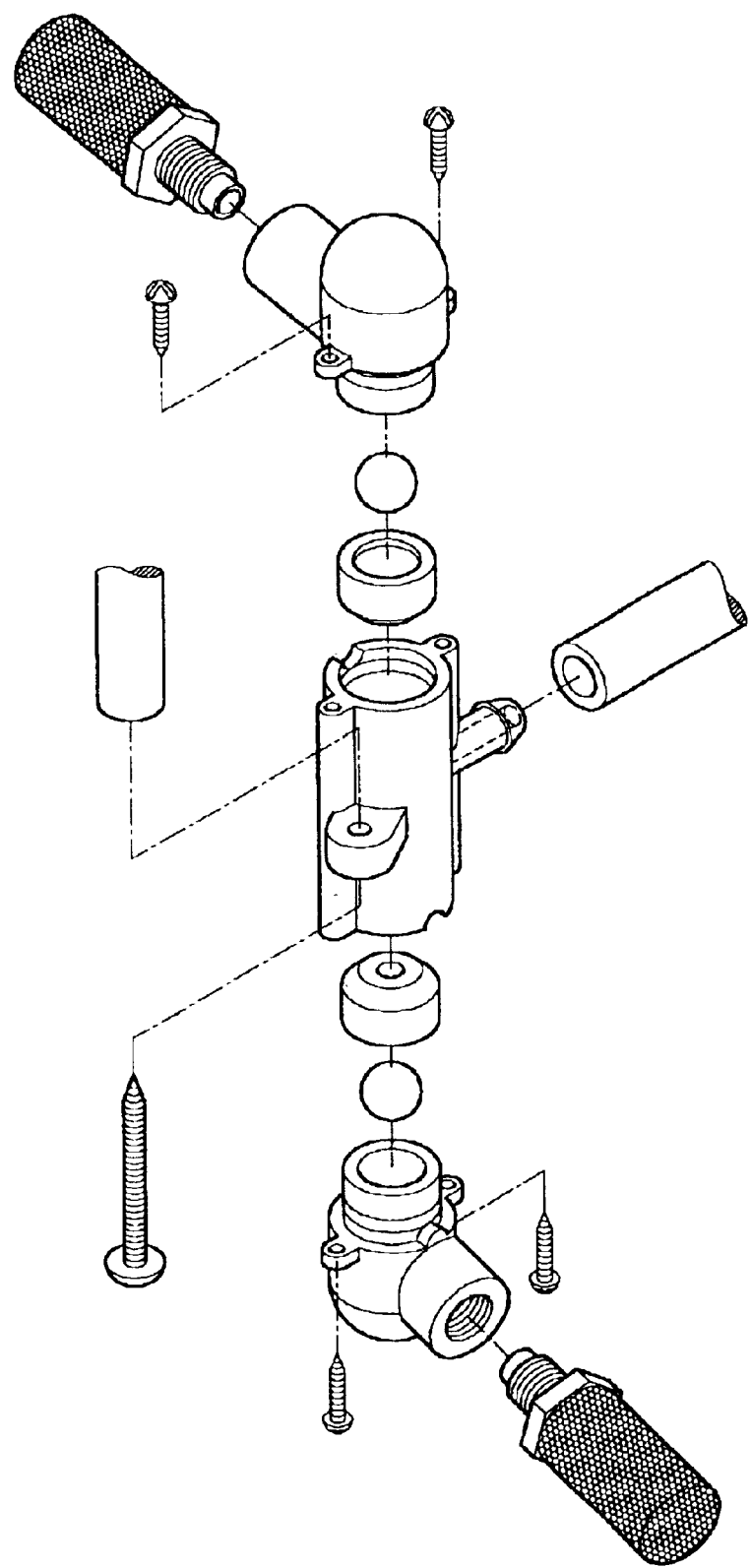
FIG. 5 is a perspective exploded view of a second embodiment of the present invention.
Figure 6A:
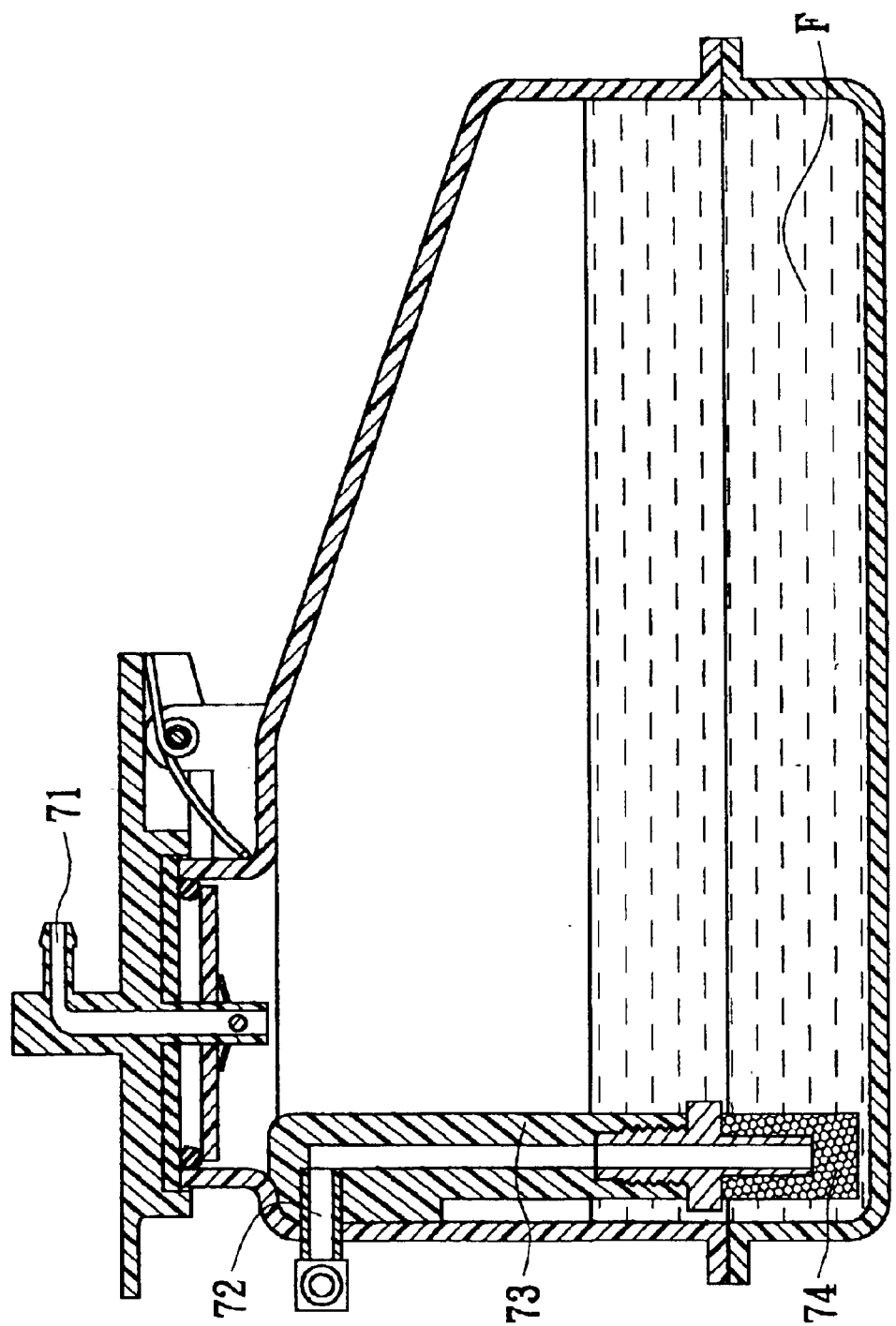
FIG. 6a shows a conventional fuel tank of a remotely controllable car.
Figure 6B:
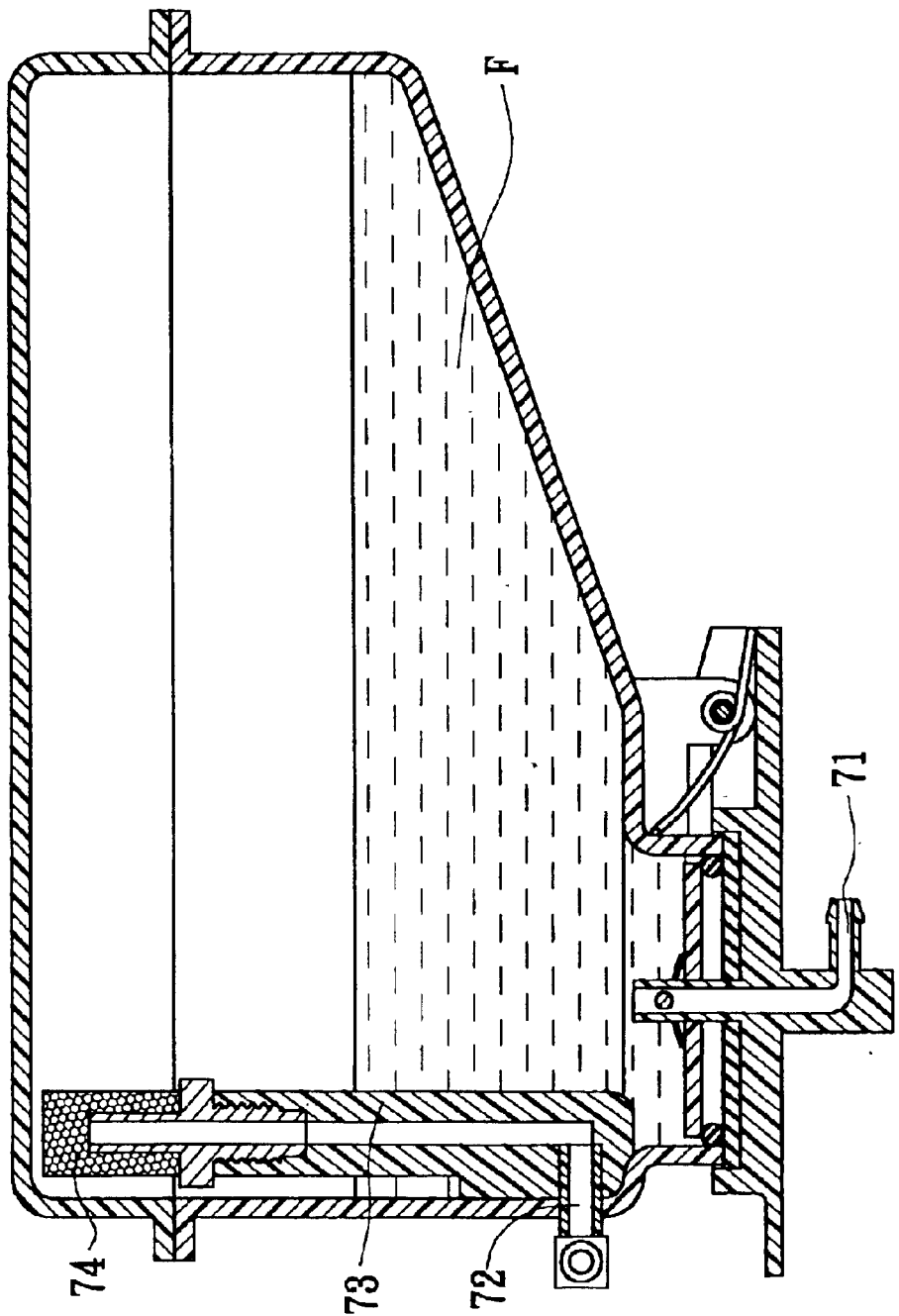
FIG. 6b shows that the remotely controllable car turns over and the conventional fuel tank is reversed so that the fuel cannot get into the fuel pipe.
Figure 7A:
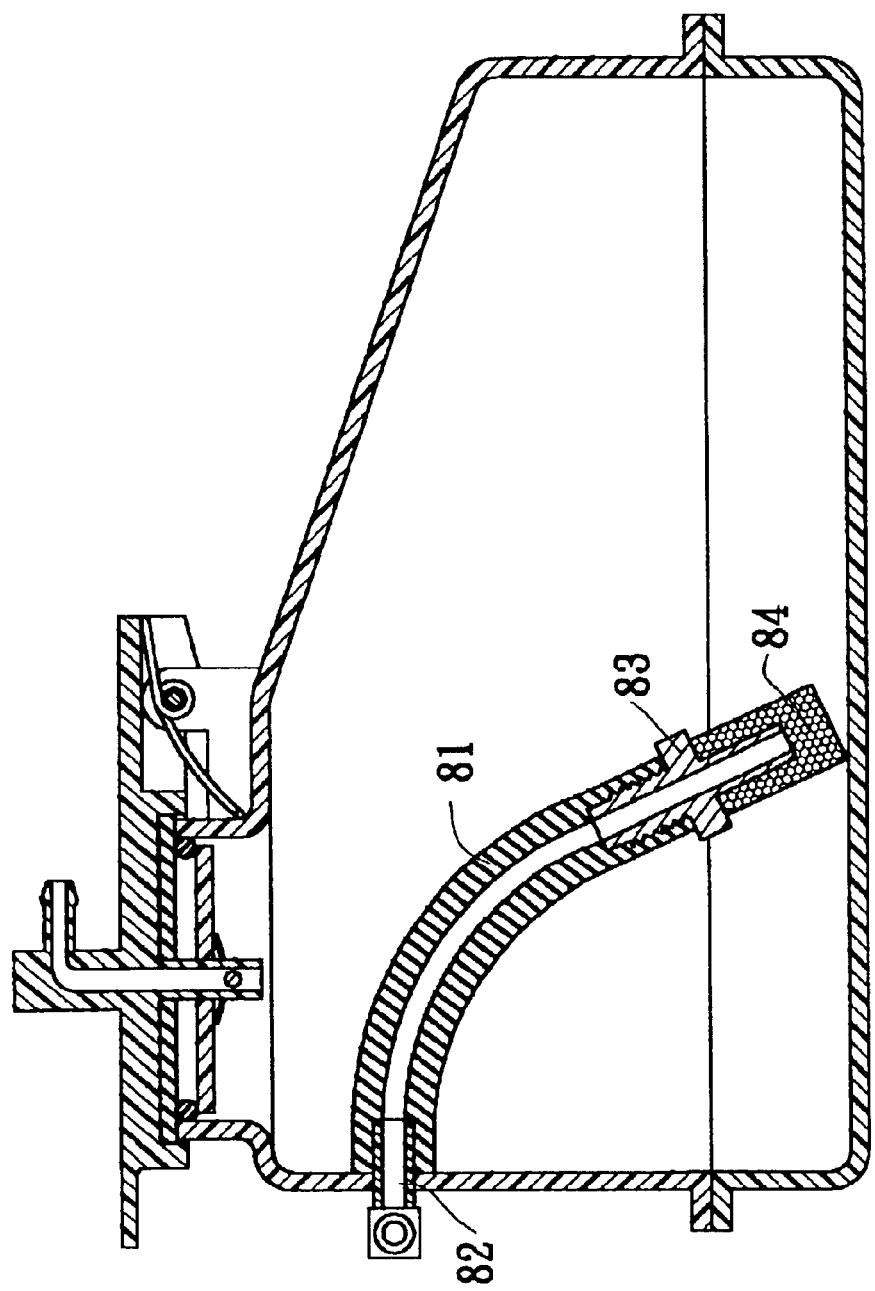
FIG. 7a shows another type of conventional fuel tank of a remotely controllable car.
Figure 7B:
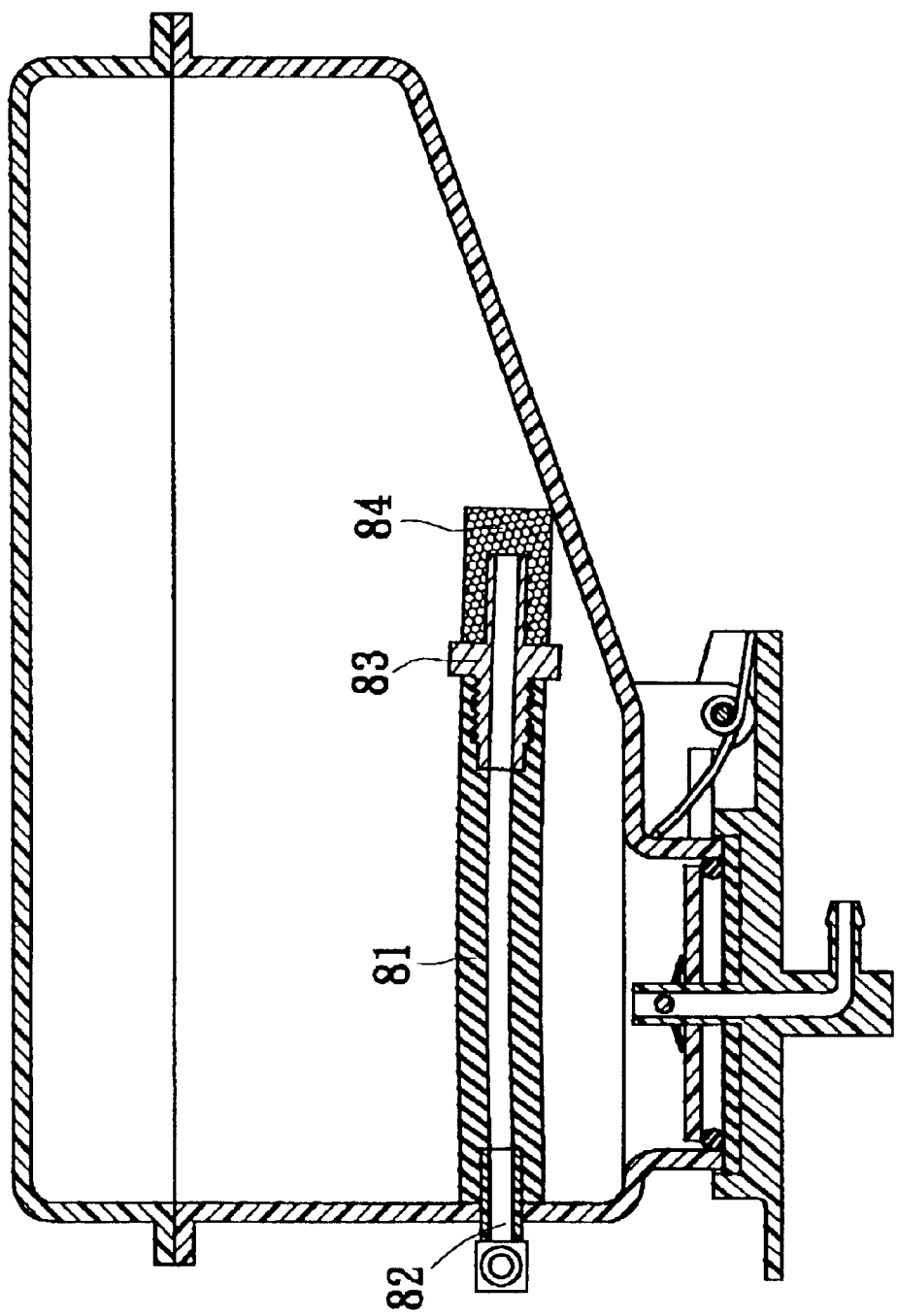
FIG. 7b shows that the remotely controllable car turns over and the conventional fuel tank is reversed and the weight block enables the fuel to get into the silicone pipe.

The above embodiment is only used to illustrate the present invention, not intended to limit the scope thereof. Many modifications of the above embodiment can be made without departing from the spirit of the present invention. For example, FIG. 5 shows a second embodiment of the present invention, in which the first and second sealing tubes are locked with the through hole by screws. This can also achieve the same function as the first embodiment.

What is claimed is:

1. A fuel tank structure of a remotely controllable car, the fuel tank having a gas inlet, a fuel pipe being disposed in the fuel tank, a middle section of the fuel pipe having a fuel outlet, in accordance with the position of the fuel outlet, the interior of the fuel pipe being divided into an upper first section and a lower second section opposite to the first section, two steel balls being respectively disposed in the first and second sections, the ends of the first and second sections proximal to the fuel outlet being respectively formed with a first and a second passages, the ends of the first and second sections distal from the fuel outlet being respectively formed with a first and a second receiving sections, the fuel pipe being formed with a first inlet between the first passage and the first receiving section and a second inlet between the second passage and the second receiving section, whereby in normal state, the steel ball in the first section due to its own weight will block the first passage, while the steel ball in the second section will drop into the second receiving section, permitting the fuel to pass through the second inlet and the second passage and discharge from the fuel outlet.

2. The fuel tank structure of a remotely controllable car as claimed in claim 1, wherein a column is disposed in the fuel tank, the fuel pipe being formed with a connecting section corresponding to the column, whereby a bolt is screwed through the connecting section into the column to fix the fuel pipe in the fuel tank.

3. The fuel tank structure of a remotely controllable car as claimed in claim 1, wherein the first and second inlets are respectively provided with two fuel filters respectively inclined toward top face and bottom face of the fuel tank.

4. The fuel tank structure of a remotely controllable car as claimed in claim 3, wherein two oblique tubes respectively extend from the first and second inlets and are respectively inclined toward the top face and bottom face of the fuel tank, the two fuel filters being respectively connected with the two oblique tubes.

5. The fuel tank structure of a remotely controllable car as claimed in claim 1, wherein the fuel pipe is upright arranged and composed of an axially through tube, a first sealing tube and a second sealing tube, the first and second sealing tubes being respectively fixed at two ends of the through tube to seal the through tube, the first and second receiving sections being respectively formed at the ends of the first and second sealing tubes distal from the through tube, two washers being respectively disposed at the adjoining sections of the first and second sealing tubes and the through tube, the interiors of the washers being formed with the first and second passages which are tapered toward the through tube.

6. The fuel tank structure of a remotely controllable car as claimed in claim 5, wherein inner circumference of each of two ends of the through tube is formed with an annular groove, the first and second sealing tubes being respectively formed with two annular ribs adapted to the annular grooves, whereby the annular ribs are respectively engaged in the annular grooves so as to fix the first and second sealing tubes.

\* \* \* \* \*